(12) United States Patent
Johnson et al.

(10) Patent No.: US 11,345,406 B2
(45) Date of Patent: May 31, 2022

(54) VEHICLE ASSEMBLY WITH GRAB BAR AND METHODS OF MAKING AND USING THE SAME

(71) Applicant: Honda Motor Co., Ltd., Tokyo (JP)

(72) Inventors: Samira S. Johnson, Dublin, OH (US); Jared C. Alquist, Dublin, OH (US); Phillip C. Nickolai, Delaware, OH (US); Timothy J. Talbert, West Liberty, OH (US); Jason Owens, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 16/704,504

(22) Filed: Dec. 5, 2019

(65) Prior Publication Data
US 2021/0171109 A1   Jun. 10, 2021

(51) Int. Cl.
*B60R 21/13* (2006.01)
*B62D 23/00* (2006.01)
*B60N 2/01* (2006.01)
*B62D 21/18* (2006.01)

(52) U.S. Cl.
CPC ........... *B62D 23/005* (2013.01); *B60N 2/012* (2013.01); *B60R 21/13* (2013.01); *B62D 21/183* (2013.01)

(58) Field of Classification Search
CPC .... B62D 23/005; B62D 21/183; B60N 2/012; B60R 21/13
USPC ....................................................... 280/756
See application file for complete search history.

(56) References Cited

U.S. PATENT DOCUMENTS

| 5,622,382 | A  | * | 4/1997  | Zepnik ................... B60R 21/13 280/756 |
| 7,032,927 | B1 | * | 4/2006  | Joranlien ................ B60R 21/13 280/756 |
| 7,249,798 | B2 | * | 7/2007  | Saito ................... B62D 33/0273 296/205 |
| 7,578,544 | B1 |   | 8/2009  | Shimamura et al. |
| 8,328,235 | B2 |   | 12/2012 | Schneider et al. |
| 8,464,827 | B2 |   | 6/2013  | Tsumiyama et al. |
| 8,651,525 | B2 |   | 2/2014  | Kaku et al. |
| 8,672,387 | B1 |   | 3/2014  | Kaku et al. |

(Continued)

FOREIGN PATENT DOCUMENTS

| EP | 2698274 B1 | 5/2017 |
| JP | 4128886 B2 | 7/2008 |

*Primary Examiner* — Toan C To
(74) *Attorney, Agent, or Firm* — Kenealy Vaidya LLP

(57) ABSTRACT

A vehicle assembly can include a frame assembly, a grab bar assembly, a vehicle seat and a crossmember. The frame assembly can define a passenger area and include a left cage side member and a right cage side member. The grab bar assembly can include a left grab bar attached to and extending from the left cage side member and a right grab bar attached to and extending from the right cage side member. The crossmember can be connected to the vehicle seat so as to support the vehicle seat. The crossmember can have a center portion. The left grab bar can be attached to the crossmember at a first location of the crossmember. The right grab bar can be attached to the crossmember at a second location of the crossmember. The first location and the second location can be equally spaced from the center portion.

19 Claims, 7 Drawing Sheets

(56) References Cited

U.S. PATENT DOCUMENTS

| | | | |
|---|---|---|---|
| 8,876,162 B2* | 11/2014 | Shinbori | B60R 22/023 |
| | | | 280/808 |
| 8,944,465 B2* | 2/2015 | Shinbori | B60N 2/01 |
| | | | 280/756 |
| 8,998,253 B2 | 4/2015 | Novotny et al. | |
| 9,216,777 B2 | 12/2015 | Nakamura et al. | |
| 9,789,909 B2 | 10/2017 | Erspamer et al. | |
| 9,815,432 B2* | 11/2017 | Kuroda | B60R 22/023 |
| 9,878,650 B2 | 1/2018 | Reed et al. | |
| 9,884,647 B2 | 2/2018 | Peterson et al. | |
| 2005/0140129 A1* | 6/2005 | Miki | B62D 25/087 |
| | | | 280/756 |
| 2005/0212277 A1* | 9/2005 | Hamamoto | B60R 21/13 |
| | | | 280/756 |
| 2005/0280253 A1* | 12/2005 | Queveau | B60R 21/13 |
| | | | 280/756 |
| 2006/0001248 A1* | 1/2006 | Queveau | B60R 21/13 |
| | | | 280/756 |
| 2008/0061542 A1* | 3/2008 | Froschle | B62D 25/087 |
| | | | 280/756 |
| 2010/0078925 A1* | 4/2010 | Froschle | B62D 25/04 |
| | | | 280/756 |
| 2015/0158449 A1* | 6/2015 | Hirata | B60R 21/13 |
| | | | 280/756 |
| 2018/0147966 A1 | 5/2018 | Reed et al. | |

* cited by examiner

VEHICLE ASSEMBLY WITH GRAB BAR AND METHODS OF MAKING AND USING THE SAME

BACKGROUND

The disclosed subject matter relates to a vehicle assembly that includes a grab bar assembly with one or more grab bars. More particularly, the disclosed subject matter relates to a grab bar assembly that can be positioned behind a seat of a vehicle, such as a front seat of the vehicle.

A vehicle can travel along any one or combination of improved, unimproved, and unmarked paths. Some vehicles can be configured with special structures that can improve passenger comfort while traveling on unimproved or unmarked paths. Travel along an unimproved path, which can include an off-road trail, for example, can result in substantial jostling of the passengers in the vehicle. The vehicle can include one or more grab bars that can be grasped by passengers of the vehicle in order to possibly assist the passenger's comfort and stability while being jostled. That is, the grab bar can help the passenger to brace themselves to better withstand jostling of the vehicle.

SUMMARY

Some embodiments are directed to a vehicle assembly for a vehicle. The vehicle assembly can include a frame assembly, a grab bar assembly, a vehicle seat and a crossmember. The frame assembly can define a passenger area. The frame assembly can include a left cage side member and a right cage side member. The grab bar assembly can include a left grab bar and a right grab bar. The left grab bar can be attached to and extend from the left cage side member. The right grab bar can be attached to and extend from the right cage side member. The crossmember can be connected to the vehicle seat so as to support the vehicle seat. The crossmember can have a center portion. The left grab bar can be attached to the crossmember at a first location of the crossmember. The right grab bar can be attached to the crossmember at a second location of the crossmember. The first location and the second location can be equally spaced from the center portion.

Some embodiments are directed to a vehicle assembly for a vehicle. The vehicle assembly can include a frame assembly, a grab bar assembly, vehicle seat row and a crossmember. The frame assembly can define a passenger area. The frame assembly can include a left cage side member and a right cage side member. The grab bar assembly can include a left grab bar, a right grab bar and a center hold member. The left grab bar that can be attached to and extend from the left cage side member. The right grab bar can be attached to and extend from the right cage side member. The center hold member can extend between and be connected to both the left grab bar and the right grab bar. The vehicle seat row can include a right vehicle seat and a left vehicle seat. The crossmember can be connected to the right vehicle seat and the left vehicle seat. The crossmember can have a center portion. The crossmember can include a left end attached to the left cage side member, and a right end attached to the right cage side member. The left grab bar can be attached to the crossmember at a first location of the crossmember. The right grab bar can be attached to the crossmember at a second location of the crossmember. The first location and the second location can be equally spaced from the center portion.

Some embodiments are directed to a vehicle that can include a vehicle body structure, a front seat, a rear seat, a grab bar assembly and a crossmember. The vehicle body structure can define a passenger area and include a left member and a right member. The front seat can be mounted to the vehicle body structure. The rear seat can be mounted to the vehicle body structure. The grab bar assembly can be mounted to the vehicle body structure. The grab bar assembly can include a left grab and a right grab bar. The left grab bar can be attached to and extend from the left member. The right grab bar can be attached to and extend from the right member. The crossmember can be connected to the front seat. The crossmember can have a center portion. The left grab bar can be attached to the crossmember at a first location of the crossmember. The right grab bar can be attached to the crossmember at a second location of the crossmember. The first location and the second location can be equally spaced from the center portion.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
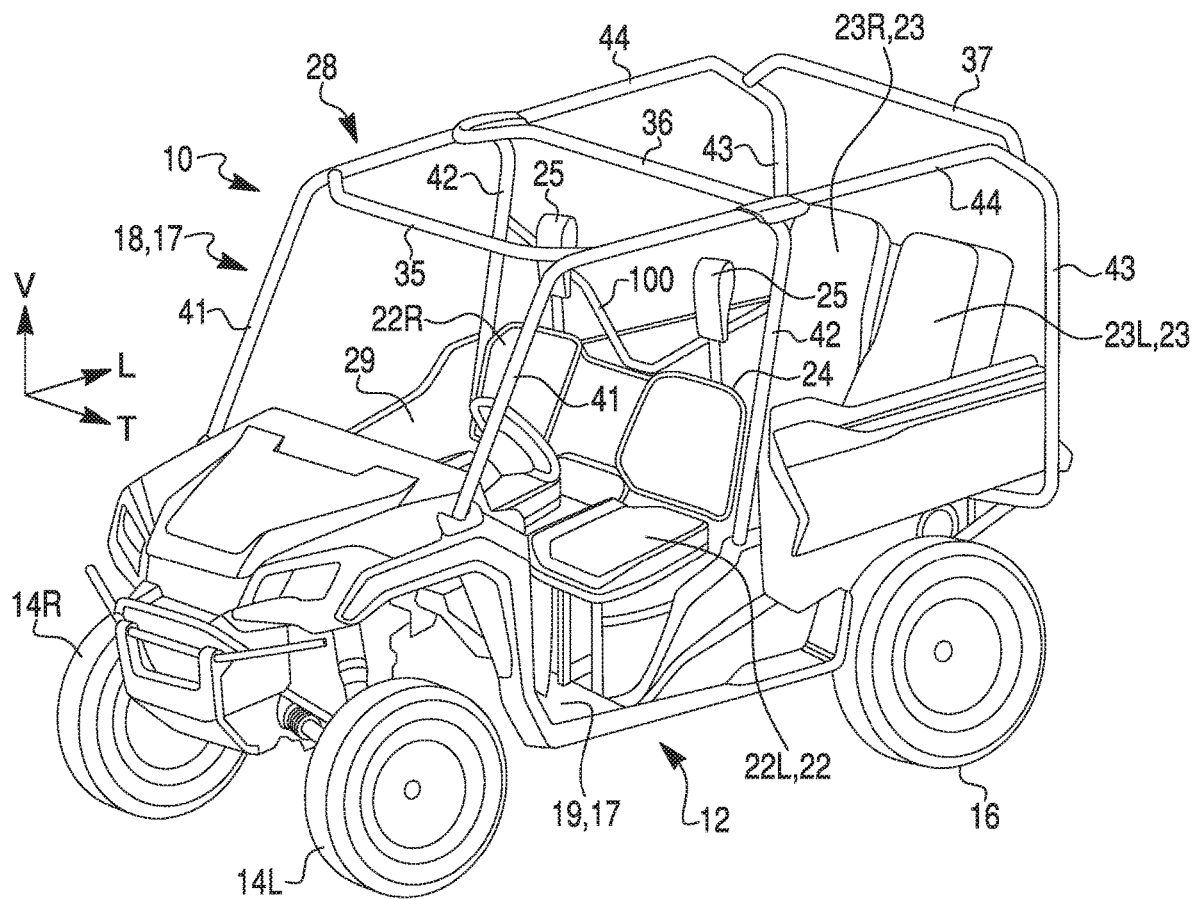
FIG. 1 is a front perspective view of an exterior of a vehicle in accordance with principles of the disclosed subject matter.

A vehicle 10 is shown in FIG. 1. The vehicle 10 can be specialized for use on an unimproved path or on an unmarked path, and can be referred to as a multipurpose utility vehicle (MUV) or as a side-by-side all-terrain vehicle (S×S, or S×S ATV). However, the grab bar assembly of the disclosure can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Referring to FIG. 1, the vehicle 10 can include a body 12, a pair of front wheels, 14L, 14R, a pair of rear wheels 16, and a frame assembly 18. The vehicle 10 can be provided with a pair of front door assemblies, a pair of rear door assemblies, and a powertrain. Portions of the frame assembly 18 and the right rear wheel are hidden from view in FIG. 1 by the body 12 and the powertrain of the vehicle 10 is omitted for simplicity and clarity of the drawings.

The vehicle 10 can include a front seat row 22, including fronts a pair of front seats 22L, 22R, and a rear seat row 23, including a pair of rear seats 23L, 23R, mounted in a passenger area 29 of the vehicle 10. The frame assembly 18 can include a rollover protection structure 28 configured to extend around and above the seats 22L, 22R, 23L, 23R and the passenger area 29. The rollover protection structure 28 can cooperate with the body 12 and/or at least a portion of the frame assembly 18 to define door openings through which a passenger may pass in order to enter or exit the passenger area.

The vehicle 10 can include a powertrain. The powertrain can include an internal combustion engine, one or more electric motor(s) or a hybrid of an internal combustion engine and one or more electric motor(s), or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16, or configured to drive all of the wheels 14L, 14R, 16.

Referring to FIG. 1, the body 12 can be formed of one or more panel structures 19 mounted on the frame assembly 18. For example, the panel structure 19 can include a panel extending around each of the wheels 14L, 14R, 16. The panel structure 19 can include one or more panels that form a cargo/storage area at the rear of the vehicle 10. The powertrain can be mounted to the frame assembly 18 at a location that is underneath the cargo/storage area. The panel structure 19 can also include floor panels. The frame assembly 18 and/or the floor panels (of the panel structure 19) can support the seats 22L, 22R, 23L, 23R. The front seats 23L, 23R can be supported by a crossmember assembly 100.

The frame assembly 18 can be configured to support the body 12, door assemblies, seats 22L, 22R, 23L, 23R, suspension components for the wheels 14L, 14R, 16, powertrain, steering system, control pedal assemblies, passengers and cargo items, for example. The frame assembly 18 can be configured to withstand various modes of operation, including operation on unimproved paths, and can be configured to surround the passenger area. The frame assembly 18 can include a main frame assembly, a front frame assembly and a rear frame assembly.

The frame assembly 18 can define the passenger area 29 of the vehicle 10. The frame assembly 18 can also provide an overall bending stiffness and torsional stiffness characteristic for the vehicle 10 that can be advantageous for rugged terrain of an unimproved path.

The frame assembly 18 can be made from any appropriate structural element(s), such as but not limited to tubes, pipes, beams, stampings, etc., that can provide sufficient strength and rigidity for the vehicle 10 including the vehicle passenger area. The frame assembly 18 can be formed from a single type of structural element, or alternatively the frame member 18 can be formed from any combination of structural elements. The structural elements can have any appropriate cross-sectional shape, such as but not limited to circular, rectangular, regular polygonal, irregular polygonal, hollow, and/or solid. The structural elements can be variable in material and geometry along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, iron, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, brackets, welding, adhesive, or any combination thereof, etc.

The frame assembly 18 can be configured to support other components such as but not limited to a radiator, a steering rack assembly, front drive assembly and a rear drive assembly.

As shown in FIG. 1, the rollover protection structure 28 can extend in the longitudinal direction L of the vehicle 10, from the front end of the passenger area 29 to the rear end of the passenger area 29. The rollover protection structure 28 can define the limits of the passenger area 29 in the transverse direction T of the vehicle 10, the longitudinal direction L of the vehicle 10 and in the vertical direction V of the vehicle 10. The rollover protection structure 28 can be configured to support door assemblies and any appropriate portion(s) of the body 12, such as but not limited to flexible side panel(s), rigid side panel(s), roof panel (rigid or flexible), flexible or rigid rear panel, etc.

The rollover protection structure 28 can be configured to resist, impede, or minimize deformation that could be caused by a load or kinetic energy input into the rollover protection structure 28. The rollover protection structure 28 can be configured with any shape and contour that can be advantageous to mate the structural performance with aesthetic appeal desired for the vehicle 10. The rollover protection structure 28 can be formed from any appropriate number of structural elements, from one to any number greater than one.

Figure 2:
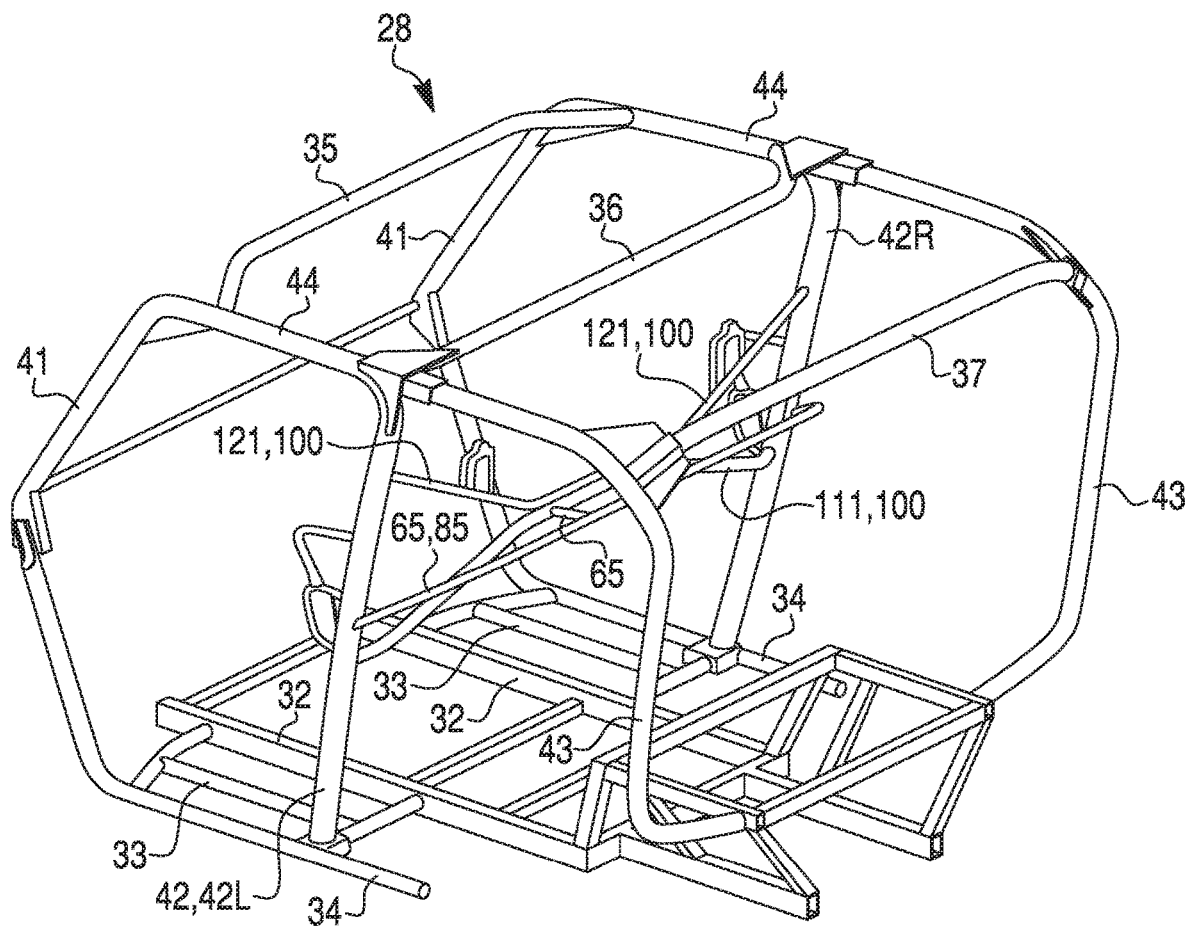
FIG. 2 is a rear perspective view of a frame assembly of the vehicle of FIG. 1.

Referring to FIG. 2, the frame assembly 18 can include a pair of first longitudinal members 32, a pair of second longitudinal members 33 and a pair of third longitudinal members. Each of the longitudinal members 32, 33, 34 can extend along the longitudinal direction of the vehicle 10 and can be spaced apart from each other in the transverse direction T of the vehicle 10.

Referring to FIGS. 1 and 2, the rollover protection structure 28 can include a plurality of cage members 35, 36, 37, 41, 42, 43, 44. The cage members can include a plurality of cage cross members 35, 36, and 37 and a plurality of cage side members 41, 42, 43, and 44. The cage side members 42 can include a left cage side member 42L and a right cage side member 42R. The right side of the rollover protection structure 28 can be mirror image to the left side of the rollover protection structure 28. Each of the cage members 35, 36, 37, 41, 42, 43, 44 can be configured as a hollow tube or pipe having a substantially circular or oval cross-section shape. The cage members 35, 36, 37, 41, 42, 43, 44 can be configured with any appropriate elongated shape that can provide the desired dimensionality of the passenger area and advantageously conform to the aesthetic appearance desired for the vehicle 10. For example, the cage members 35, 36, 37, 41, 42, 43, 44 can be made from one or more lengths of a metal tube. Any one of the tubular cage members can be bent in one or more locations into a predetermined shape.

Each of the first cage side members 41 can be referred to as an A-pillar. Each of the first cage side members 41 can be connected at one end to a respective on of the third longitudinal member 34 of the frame assembly 18 adjacent the front end of the respective one of the longitudinal members. Each of the first cage side members 41 can extend along each of the vertical direction V, the transverse direction T and the longitudinal direction L of the vehicle 10.

As shown in FIG. 1, the rollover protection structure 28 can also include fourth cage side members 44. Each of the fourth cage side members 44 can be referred to as a roof rail or a top rail. Each of the fourth cage side members 44 can extend from and connect to a respective one of the first cage side members 41. Each of the fourth cage side members 44 can connect to a respective one of the third cage side members 43. Each of the fourth cage side members 44 can connect to a respective one of second cage side members 42. Each of the fourth cage side members 44 can extend along at least the longitudinal direction L of the vehicle 10.

The first cage cross member 35 can be connected to either the first cage side members 41 or the fourth cage side members 44 at a location that is adjacent to or at the junction of the first cage side members 41 and the fourth cage side members 44. Alternatively, the first cage cross member 35 can be connected at the junction of the first cage side members 41 and the fourth cage side members 44.

Each of second cage side members 42 can be referred to as a B-pillar. Each of the second cage side members 42 can be connected at a first end, either directly or indirectly, to a respective one of the longitudinal members 34 of the frame assembly 18. Each of the second cage side members 42 can be connected at a second end to a respective one of the fourth cage side members 44. The second cage cross member 36 can be connected to either the fourth cage side members 44, or the second cage side members 42, or a location that is adjacent to or at the junction of the fourth cage side members 44 and the second cage side members 42.

Each of third cage side members 43 can be referred to as a C-pillar. Each of the third cage side members 43 can be connected at a first end to a respective one of the longitudinal members 34. Each of the third cage side members 43 can be connected at a second end to a respective one of the fourth cage side members 44.

The third cage cross member 37 can be connected to either the fourth cage side members 44, or the third cage side members 43, or alternatively, at a location that is adjacent to or at the junction of the fourth cage side members 44 or the third cage side members 43.

The cage cross members 35, 36, 37, can extend in the transverse direction T of the vehicle 10 from the left side of the roll cage 28 to the right side of the rollover protection structure 28. The cage cross members 35, 36, 37 can define limits of the passenger area 29 in the longitudinal direction L of the vehicle 10 and the vertical direction V of the vehicle 10. The cage cross members 35, 36, 37 can be connected to a respective left-side and right-side pair of the cage side members 41, 42, 43, 44 by welding.

The vehicle 10 in accordance with principles of the disclosed subject matter can include a grab bar assembly 51. In addition to providing the passenger(s) with a structure that can assist the passenger(s) in bracing against jostling during operation of the vehicle 10, the grab bar assembly 51 can contribute to the overall strength and rigidity of the frame assembly 18, including but not limited to the rollover protection structure 28. Further, the grab bar assembly 51 can be configured to simplify the assembly process for securing the grab bar assembly 51 onto the frame assembly 18. Further details of the grab bar are described below.

Figure 4:
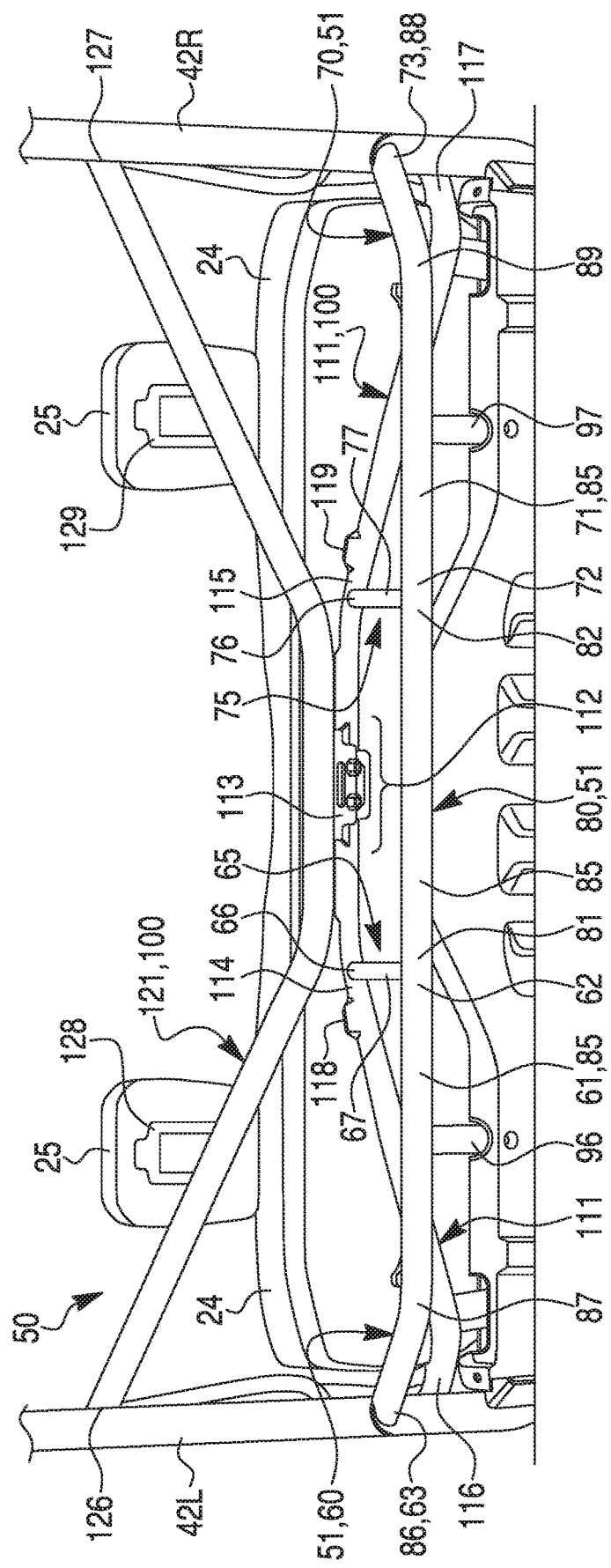
FIG. 4 is a rear view of the vehicle assembly of the vehicle of FIG. 1.

With reference to FIG. 4, the vehicle 10 can include a vehicle assembly 50. The vehicle assembly 50 can include the frame assembly 18 or part of the frame assembly 18. The vehicle assembly 50 can also include a grab bar assembly 51. The grab bar assembly 51 can include a grab bar or grab bar structure that spans the entire width of the rear seat row 23 in the transverse direction T of the vehicle 10.

The grab bar assembly 51 can include a left grab bar 60 and a right grab bar 70. The left grab bar 60 can be attached to and extend from the left second cage side member 42L. The right grab bar 70 can be attached to and extend from the right second cage side member 42R. The vehicle assembly 50 can also include the front seat row 22 and a cross member 111. The crossmember 111 can be a part of the crossmember assembly 100. The crossmember 111 can be connected to the front seats 22L, 22R so as to support the front seats 22L, 22R. The crossmember 111 can include a center portion 112. The center portion 112 can be a portion or area of the crossmember 111 that is at or about the geometrical center of the crossmember 111 between the right-hand side of the vehicle and the left-hand side of the vehicle with respect to the transverse direction T of the vehicle 10. The center portion 112 can be a portion or area of the crossmember 111 that is equidistantly spaced from a left end 116 of the crossmember 111 and a right end 117 of the crossmember 111 as measured in the transverse direction T of the vehicle 10.

The crossmember 111 can be integrated with or an integral part of the front seats 22L, 22R. The crossmember 111 can be connected to the front seats 22L, 22R using any of a variety of fasteners, brackets, flanges, attachment devices, or other attachment mechanisms.

The left grab bar 60 can be attached to the crossmember 111 at a first location 114 of the crossmember 111. The right grab member 70 can be attached to the crossmember 111 at a second location 115 of the crossmember 111. The first location 114 and the second location 115 can be equally spaced from the center portion 112.

As is shown in FIG. 4, the left grab bar 60 can include a left hold member 61 and a left strut member 65. The left hold member 61 can include an inboard portion 62 and an outboard end 63. The left strut member 65 can include a forward end 66 and a back end 67. The left hold member 61 can extend from the left second cage side member 42L to the left strut member 65. That is, the outboard end 63 can be connected to the left second cage side member 42L. The inboard portion 62 can be connected to the back end 67 of the left strut member 65. The left strut member 65 can be connected, at the forward end 66, with the crossmember 111. Specifically, the forward end 66 can be connected (to the crossmember 111) at the first location 114 of the crossmember 111.

The right grab bar 70 can be of similar or same construction to the left grab bar 60, but in mirror image. The right grab bar 70 can include a right hold member 71 and a right strut member 75. The right hold member 71 can include an inboard portion 72 and an outboard end 73. The right strut member 75 can include a forward end 76 and a back end 77. The right hold member 71 can extend from the right second cage side member 42R to the right strut member 75. Accordingly, in similar manner to the left grab bar 60, the outboard end 73 (of the right hold member 71) can be connected to the right second cage side member 42R. The inboard portion 72 can be connected to the back end 77 of the right strut member 75. The forward end 76 (of the right strut member 75) can be connected to the crossmember 111 at the second location 115.

Accordingly, the left strut member 65 and the right strut member 75 can serve to connect and be connected to the left hold member 61 and the right hold member 71, respectively. The left strut member 65 can extend between an inboard portion 62 of the left hold member 61 and the first location 114. The right strut member 75 can extend between an inboard portion 72 of the right hold member 71 and the second location 115. Accordingly, the inboard portion 62 of the left hold member 61 can be defined by attachment, or an attachment location, to the left strut member 65. The inboard portion 72 of the right hold member 71 can be defined by attachment, or an attachment location, to the right strut member 75.

The left strut member 65 can extend along a longitudinal direction of the vehicle. The right strut member 75 can extend along a longitudinal direction of the vehicle.

As is shown in FIG. 4, for example, the grab bar assembly 51 can also include a center hold member 80. The center hold member 80 can extend between the inboard end 62 of the left hold member 61 and the inboard end 72 of the right hold member 71. The center hold member 80 can include a left portion 81 and a right portion 82. The left portion 81 can extend from and be connected to the inboard portion 62 of the left grab bar 60. The right portion 82 can extend from and be connected to the inboard portion 72 of the right grab bar 70.

The left hold member 61, the right hold member 71, and the center hold member 80 can collectively form an extended hold member 85. That is, the extended hold member 85 can include the left hold member 61, the right hold member 71, and the center hold member 80. The extended hold member 85 can extend from the left second cage side member 42L across the vehicle to the right second cage side member 42R. The extended hold member 85 can be of homogenous construction throughout the length of the extended hold member 85 that includes the left hold member 61, the right hold member 71, and the center hold member 80. Alternatively, the left hold member 61, the right hold member 71, and the center hold member 80 can be constructed in pieces and attached together so as to collectively form the extended hold member 85. Such portions 61, 71, 80 can be attached with one of the members telescopically received into another of the members. Such portions 61, 71, 80 can be attached to each other utilizing a separate joining piece that telescopically engages with two portions, of the portions 61, 71, 80, so as to join together such two portions. Alternate embodiments can include the portions 61, 71, 80 butt welded to each other.

The extended hold member 85 can include straight portions and bent portions. The extended hold member 85 can include a left bend 87. The left bend 87 can be adjacent to a left end 86. The left bend 87 can be spaced from the left end 86. The extended hold member 85 can include a right bend 89. The right bend 89 can be adjacent to a right end 88. The right bend 89 can be spaced from the right end 88. The left bend 87 can be substantially along a horizontal plane, i.e., the structural members that are bent can be positioned in a horizontal plane so as to be bent about a vertical axis of the vehicle 10. Other geometries can alternatively be utilized for the bend. For example, the left bend 87 can be positioned in a plane that is off horizontal, with a downward slope rear-to-front. The right bend 89 can be of similar structure to the left bend 87, but in mirror image to the left bend 87.

With further reference to FIG. 4, the left end 86 of the extended hold member 85 can correspond to or be the same as the outboard end 63 of the left hold member 61. Additionally, the right end 88, of the extended hold member 85, can correspond to or be the same as the outboard end 73 of the right hold member 71.

With reference to FIG. 2 and FIG. 4, the left hold member 61 can be positioned perpendicular or substantially perpendicular to the left strut member 65. In similar manner, the right hold member 71 can be positioned perpendicular or substantially perpendicular to the right strut member 75. Other geometries and/or orientations can be provided as desired.

Figure 5:
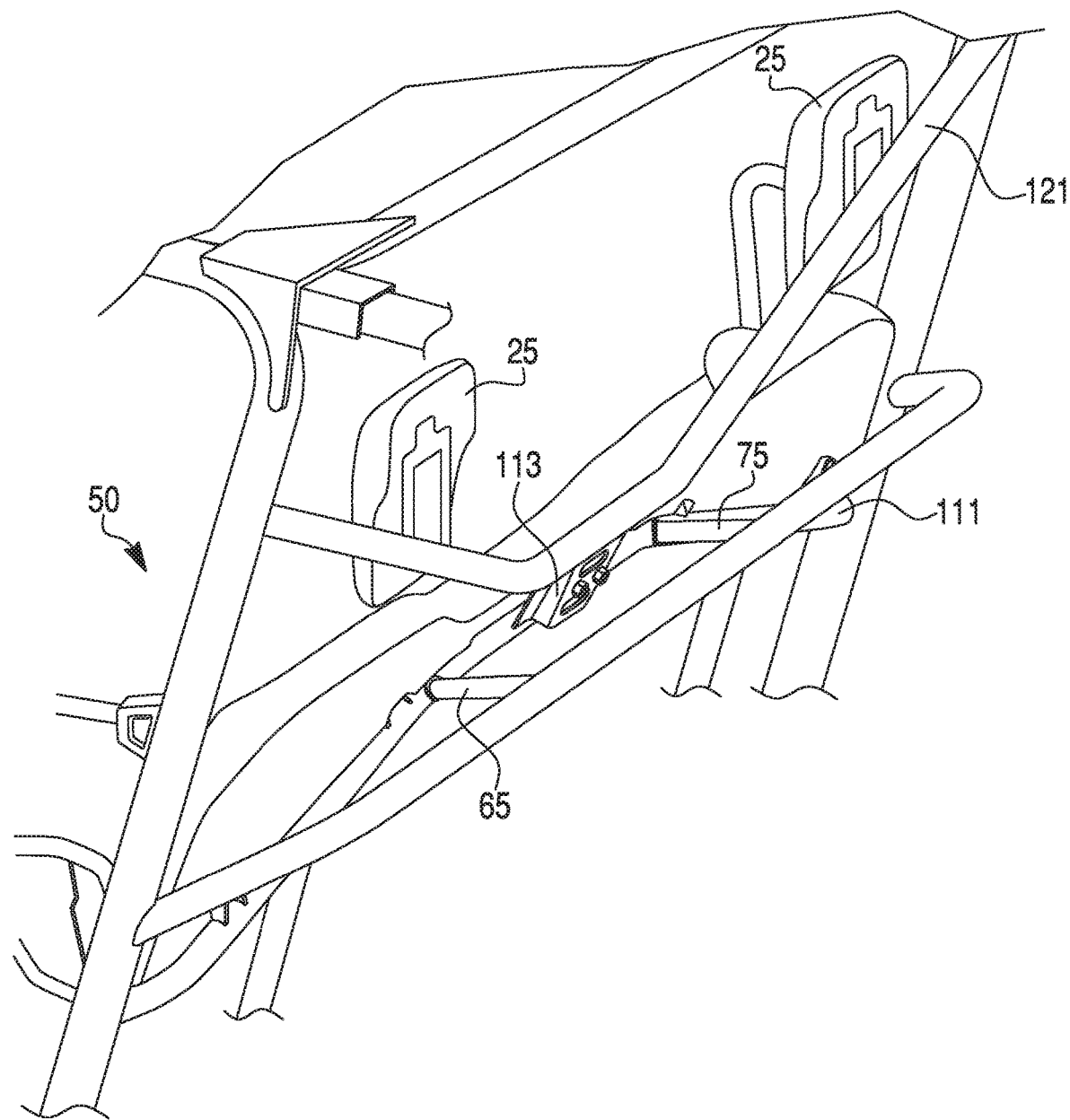
FIG. 5 is a rear perspective view of the vehicle assembly of FIG. 4.

With reference to FIG. 2 and FIG. 4, the crossmember assembly 100 can also include a crossmember 121. The crossmember 121 can be an upper crossmember. The cross member 111 can be a lower crossmember. As shown in FIG. 5, the crossmember 111 can be connected to the crossmember 121 using a connection bracket 113. The connection bracket 113 can be of U-shaped, angled shape, or other shape so as to provide structural strength and integrity. The connection bracket 113 can be attached to the crossmember 111 and the crossmember 121 using mechanical fasteners, such as screws or bolts, and/or by welding. Alternatively, or in addition to, the crossmember 111 can be otherwise fastened to the crossmember 121, such as by welding.

The crossmember 121 can include a center portion 122. The center portion 122 can be a portion or area of the crossmember 121 that is at or about the geometrical center of the crossmember 121 between the right-hand side of the vehicle and the left-hand side of the vehicle. The center portion 112 can be a portion or area of the crossmember 111 that is equidistantly spaced from a left end 126 of the crossmember 111 and a right end 127 of the crossmember 111 as measured in the transverse direction T of the vehicle 10. The left end 126 can be connected to the left cage side member 42L. The right end 127 can be connected to the right cage side member 42R.

The crossmember 111 can be attached to, integrated with, and/or an integral part of the front seats 22L, 22R. As shown in FIG. 4, the crossmember 111 can be provided with a left seat attachment 118 and a right seat attachment 119. The seat attachments 118, 119 can be in the form of any suitable mechanical fasteners such as brackets, flanges, or other mechanical fastener. The seat attachments 118, 119 can be mechanically attached to one or both the front seats 22L, 22R and/or attached to structure that supports one or both the front seats 22L, 22R. For example, each of the front seats 22L, 22R can include a seat back 24 that is connected to the crossmember 111 by the seat attachments 118, 119.

The crossmember 121 can be provided with seat connections or attachments 128, 129. For example, the seat connections 128, 129 can be connected to and provide support to the front seats 22L, 22R, including a portion of the front seats 22L, 22R that supports a person's body and a head rest 25 of each of the front seats 22L, 22R.

Figure 3:
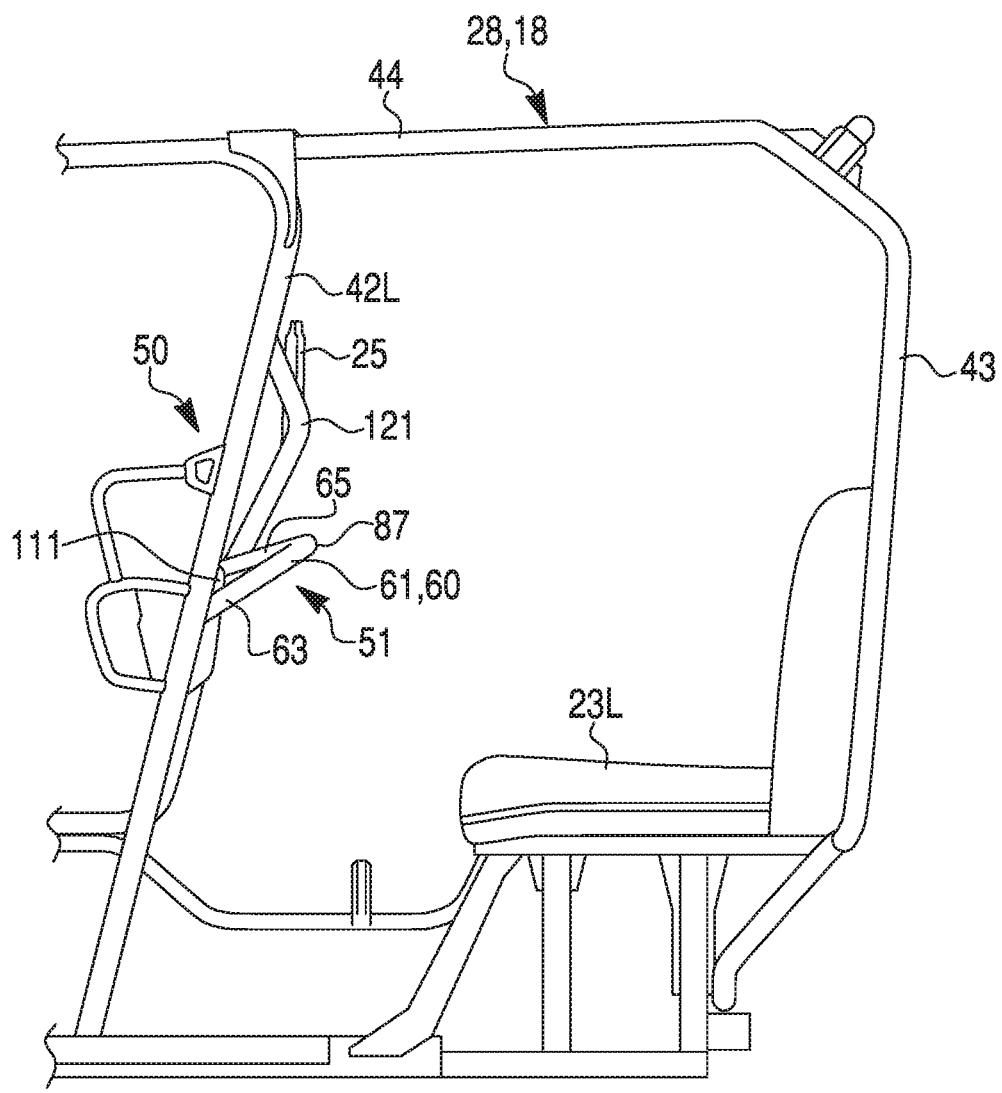
FIG. 3 is a side view of a vehicle assembly of the vehicle of FIG. 1.

FIG. 3 is a left side view showing a vehicle assembly 50 in accordance with at least one embodiment of the disclosure. FIG. 3 shows details of the frame assembly 18 including the rollover protection structure 28, as well as grab bar assembly 51. The front seats 22L, 22R are omitted from FIG. 3 for simplicity and clarity of the drawing.

For purposes of illustration, the grab bar assembly 51 has been described herein as being positioned between front seats 22L, 22R and rear seats 23L, 23R. Such arrangement can provide for an occupant in one of the rear seats 23L, 23R to grab onto the grab bar assembly 51. In particular, the occupant riding in one of the rear seats 23L, 23R can grab onto the extended hold member 85 or any of the components of the extended hold member 85, including the left hold member 61, the right hold member 71, and the center hold member 80. However, the vehicle 10 can include one or more further seats behind the rear seats 23L, 23R. In such an arrangement, an additional grab bar assembly 51 can be provided for additional occupants in such additional seats.

Figure 6:
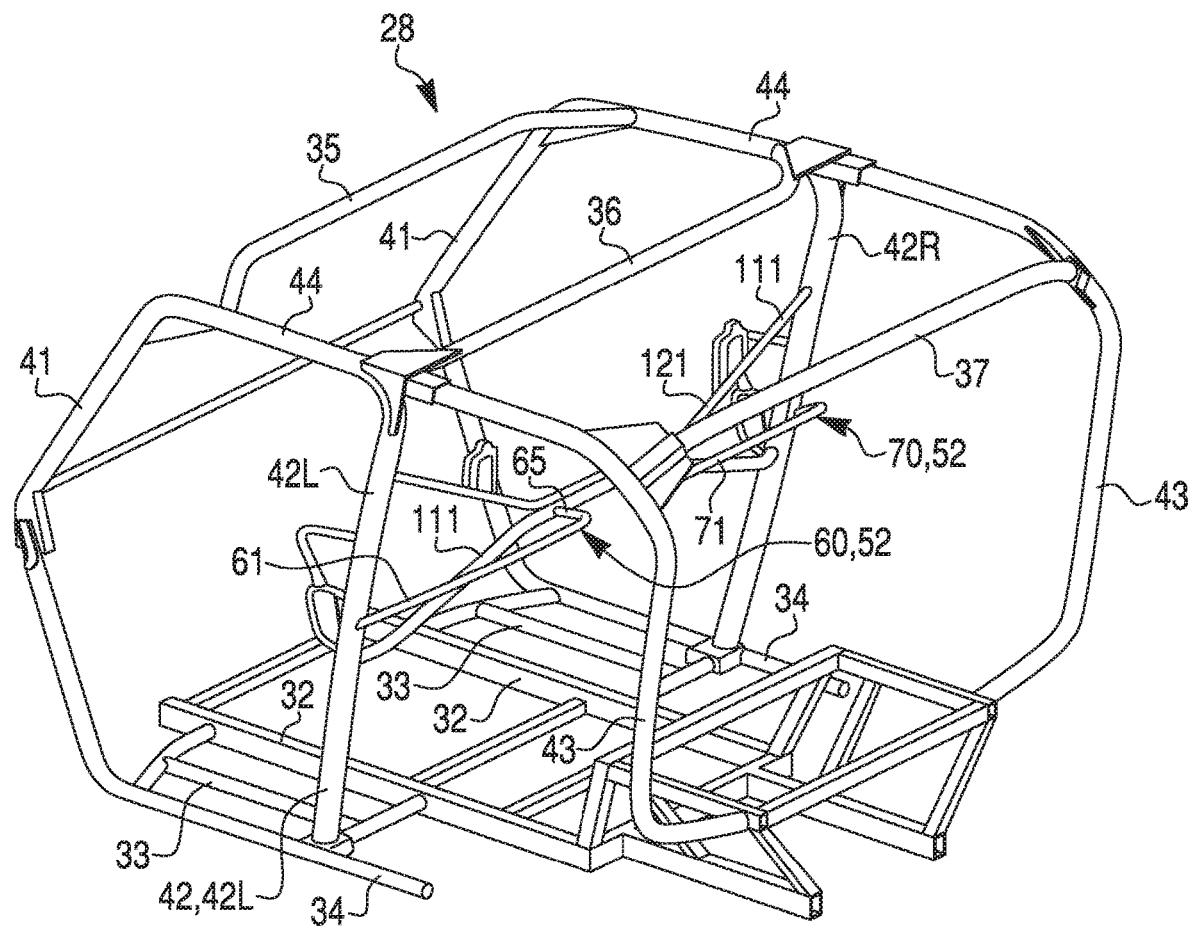
FIG. 6 is a rear perspective view of an alternate embodiment of a grab bar assembly of the vehicle of FIG. 1.
Figure 7:
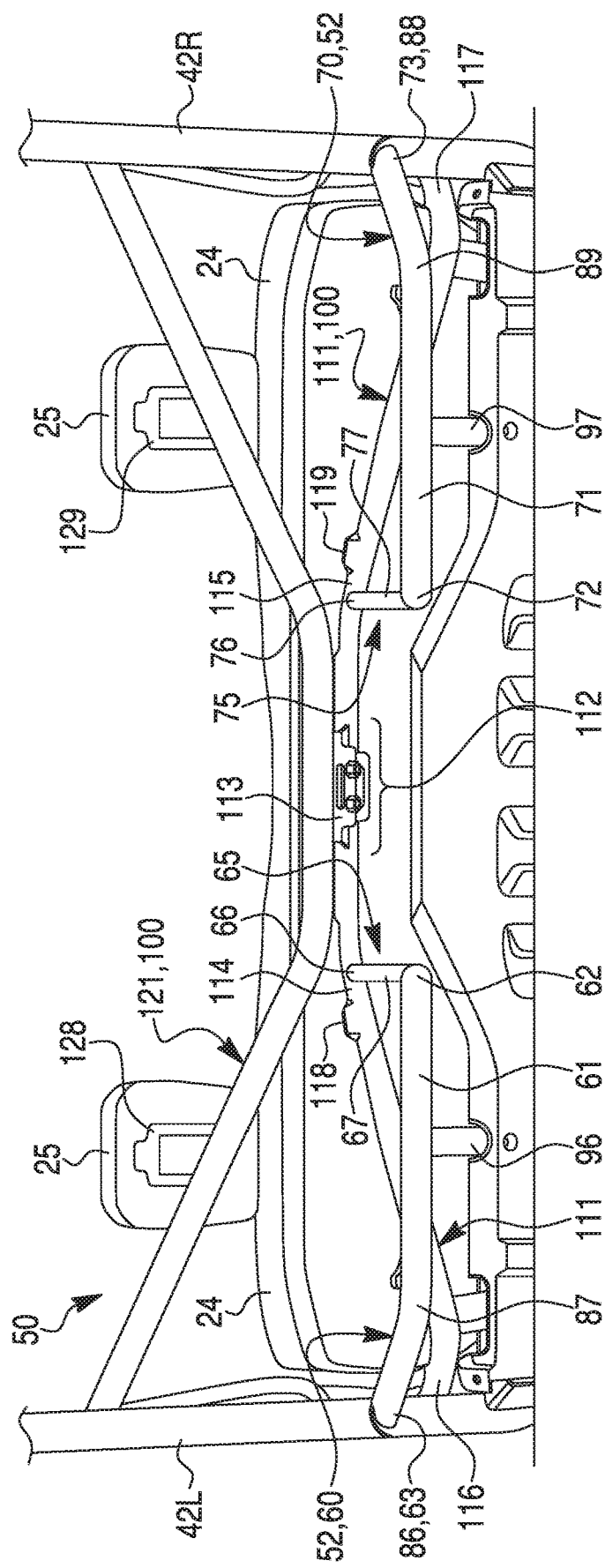
FIG. 7 is a rear view of a vehicle assembly in accordance with the alternate embodiment of FIG. 6.

FIG. 6 is a rear perspective view of an alternate embodiment of a frame assembly 18 of a vehicle in accordance with principles of the disclosed subject matter. FIG. 7 is a rear view of a vehicle assembly 50 in accordance with the alternate embodiment of FIG. 6.

In FIG. 6, the frame assembly 18 and the rollover protection structure 28 can be the same as described above. The vehicle assembly 50 can include a grab bar assembly 52 that is different from the grab bar assembly 51 of FIGS. 1-5. The grab bar assembly 52 can include a left grab bar 60 and a right grab bar 70. The left grab bar 60 can include a left hold member 61 and a left strut member 65. The right grab bar 70 can include a right hold member 71 and a right strut member 75. The grab bar assembly 52, as shown in FIGS. 6 and 7, can omit the center hold member 80. That is, the right grab bar 60 can terminate at the inboard portion 62 and the right grab bar 70 can terminate at the inboard portion 72. In such arrangement, the left hold member 61 and the left strut member 65 (of the left grab bar 60) can be welded together or can be a single, homogenous tube or pipe. The right grab bar 70 can be of similar construct as the left grab bar 60, but in mirror image.

While certain embodiments of the invention are described above, it should be understood that the invention can be embodied and configured in many different ways without departing from the spirit and scope of the invention.

Various components of embodiments of the disclosure can be made from any of a variety of materials including, for example, steel, metal, plastic, plastic resin, nylon, composite material, and/or rubber, for example, or any other material as may be desired.

Features, elements and/or characteristics described with respect to one embodiment of the disclosure may be variously used with other embodiments of the disclosure as may be desired.

A variety of production techniques can be used to make the apparatuses as described herein. For example, suitable casting and/or injection molding and other molding techniques, extrusion and other manufacturing techniques can be utilized. Also, metal stamping or cutting can be utilized. For example, metal stamping or cutting, as well as bending, can be utilized in construction of the connection bracket 113.

For example, additional support structure can be utilized so as to support the crossmember 111 and/or the crossmember 121. Such additional support structure can include a left crossmember support strut 96 and a right crossmember support strut 97 as shown in FIG. 4.

As described above, while an illustrative grab bar assembly 51 has been described as positioned behind the front seat row 22, the disclosure is not limited to such particulars. There may be more than two rows of seats in a vehicle. With such arrangement, a grab bar assembly 51 can be positioned behind each seat in the second row of seats, so as to afford a grab bar in accordance with the disclosed subject matter to passengers in additional row of seats.

The exemplary extended hold member 85 described above can be a unitary homogenous bar. However, alternate embodiments can include an extended hold member 85 that is formed in pieces and fastened together in some manner.

Embodiments are shown in the drawings in which the crossmember 111 is curved so as to be higher in the middle and the crossmember 121 is curved so as to be lower in the middle. The cross members 111, 121 are connected by connection bracket 113. However, alternate embodiments can include different geometries of the crossmember 111 and the crossmember 121. For example, the crossmember 111 can extend between the cage side members 42 in a straight or linear manner with the crossmember 121 being curved. For example, the crossmember 121 can extend between the cage side members 42 in a straight or linear manner with the crossmember 111 being curved.

For example, embodiments are disclosed above in which the grab bar assembly 51 and the crossmember assembly 100 include components that possess a specific shape, geometry, or construction. It is appreciated that shape and structure of components described herein may vary between different types of vehicles. Accordingly, exemplary embodiments are also intended to include other assemblies that include variations in shape, geometry, or construction as dependent on shape of the seat and/or frame assembly of a particular vehicle, for example.

The front seat row 22 and the rear seat row 23 are described above as having a pair of discrete seats 22L, 22R, 23L 23R. However, alternate embodiments can include a front seat row 22 and a rear seat row 23 that accommodate at least one passenger for each row. Alternate embodiments of the front seat row 22 and/or the rear seat row 23 can include a bench seat that accommodates two or more passengers in each row.

What is claimed is:

1. A vehicle assembly for a vehicle, the vehicle assembly comprising:
   a frame assembly that defines a passenger area, the frame assembly including a left cage side member and a right cage side member;
   a grab bar assembly that includes:
      a left grab bar that is attached to and extends from the left cage side member; and
      a right grab bar that is attached to and extends from the right cage side member;
   a vehicle seat; and
   a crossmember that is connected to the vehicle seat so as to support the vehicle seat, and the crossmember has a center portion, and the crossmember extends from each of the left cage side member and the right cage side member,
      the left grab bar is attached to the crossmember at a first location of the crossmember,
      the right grab bar is attached to the crossmember at a second location of the crossmember, and
      the first location and the second location are equally spaced from the center portion, wherein
   the left grab bar includes a left hold member and a left strut member, and
   the right grab bar includes a right hold member and a right strut member.

2. The vehicle assembly of claim 1, wherein
   the left hold member extends from the left cage side member to the left strut member, and
   the right hold member extends from the right cage side member to the right strut member.

3. The vehicle assembly of claim 2, wherein
   the left strut member extends between (a) an inboard portion of the left hold member and (b) the first location, and
   the right strut member extends between (a) an inboard portion of the right hold member and (b) the second location.

4. The vehicle assembly of claim 3, wherein
the left strut member extends along a longitudinal direction of the vehicle, and
the right strut member extends along a longitudinal direction of the vehicle.

5. The vehicle assembly of claim 1, wherein
an inboard portion of the left hold member is defined by attachment to the left strut member; and
an inboard portion of the right hold member is defined by attachment to the right strut member.

6. The vehicle assembly of claim 5, wherein
the grab bar assembly further includes a center hold member, and the center hold member extends between the inboard portion of the left hold member and the inboard portion of the right hold member, and
the left hold member, the right hold member, and the center hold member collectively form an extended hold member that extends from the left cage side member to the right cage side member.

7. The vehicle assembly of claim 6, wherein
the extended hold member is bent at a left bend adjacent a left end of the extended hold member that connects to the left cage side member, and
the extended hold member is bent at a right bend adjacent a right end of the extended hold member that connects to the right cage side member.

8. The vehicle assembly of claim 7, wherein
the left bend is along a substantially horizontal plane, and
the right bend is along the substantially horizontal plane.

9. The vehicle assembly of claim 1, wherein
the grab bar assembly further includes a center hold member, and the center hold member extends between an inboard portion of the left hold member and an inboard portion of the right hold member, and
the left hold member, the right hold member, and the center hold member collectively form an extended hold member that extends from the left cage side member to the right cage side member.

10. The vehicle assembly of claim 9, wherein the extended hold member is homogenous in construction and constructed of a single uniform pipe.

11. The vehicle assembly of claim 1, wherein
the left hold member is perpendicular to the left strut member, and
the right hold member is perpendicular to the right strut member.

12. The vehicle assembly of claim 1, wherein
the left grab bar is welded at the first location, and
the right grab bar is welded at the second location.

13. A vehicle assembly for a vehicle, the vehicle assembly comprising:
a frame assembly that defines a passenger area, the frame assembly including a left cage side member and a right cage side member;
a grab bar assembly that includes:
  a left grab bar that is attached to and extends from the left cage side member;
  a right grab bar that is attached to and extends from the right cage side member; and
  a center hold member that extends between and is connected to both the left grab bar and the right grab bar;
a vehicle seat row that includes a right vehicle seat and a left vehicle seat; and
a crossmember that is connected to the right vehicle seat and the left vehicle seat, the crossmember has a center portion, and the crossmember includes a left end attached to the left cage side member, and a right end attached to the right cage side member,
  the left grab bar is attached to the crossmember at a first location of the crossmember,
  the right grab bar is attached to the crossmember at a second location of the crossmember, and
  the first location and the second location are equally spaced from the center portion.

14. The vehicle assembly of claim 13, wherein
the left grab bar includes a left hold member and a left strut member, and
the right grab bar includes a right hold member and a right strut member.

15. The vehicle assembly of claim 13, wherein the left grab bar, the right grab bar and the center hold member collectively form an extended hold member that spans between the left cage side member and a right cage side member.

16. The vehicle assembly of claim 15, the extended hold member is straight along a middle portion thereof and bent adjacent opposing ends of the extended hold member.

17. A vehicle comprising:
a vehicle body structure that defines a passenger area and that includes a left member and a right member;
a front seat mounted to the vehicle body structure;
a rear seat mounted to the vehicle body structure;
a grab bar assembly mounted to the vehicle body structure, and the grab bar assembly includes:
  a left grab bar that is attached to and extends from the left member; and
  a right grab bar that is attached to and extends from the right member; and
a crossmember that is connected to the front seat, and the crossmember has a center portion,
  the left grab bar attached to the crossmember at a first location of the crossmember;
  the right grab bar attached to the crossmember at a second location of the crossmember;
  the first location and the second location being equally spaced from the center portion; and
  at least one of the left grab bar and the right grab bar includes a hold member that is located between the crossmember and the rear seat in a longitudinal direction of the vehicle.

18. The vehicle of claim 17, wherein the grab bar assembly further includes a center hold member that (a) is connected to left grab bar and the right grab bar and (b) extends between the left grab bar and the right grab bar.

19. The vehicle of claim 17, wherein the vehicle body structure includes a frame assembly, and the grab bar assembly extends in a transverse direction of the vehicle from a first side of the frame assembly to a second side of the frame assembly.

* * * * *